No. 732,709. PATENTED JULY 7, 1903.
H. R. CASSEL.
APPARATUS FOR EXTRACTING GOLD FROM ORES.
APPLICATION FILED OCT. 22, 1902.
NO MODEL.
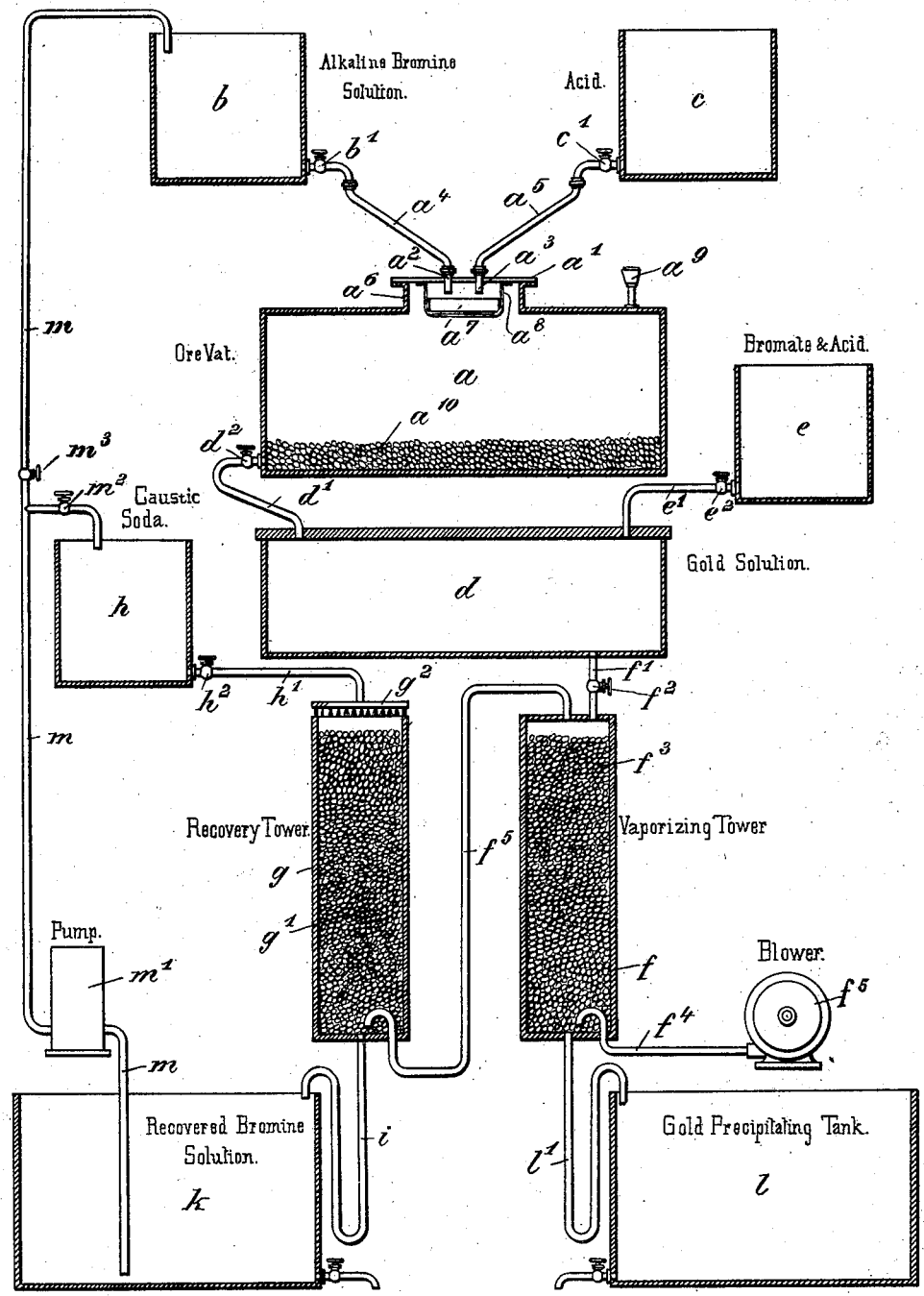

No. 732,709. Patented July 7, 1903.

UNITED STATES PATENT OFFICE.

HENRY R. CASSEL, OF NEW YORK, N. Y.

APPARATUS FOR EXTRACTING GOLD FROM ORES.

SPECIFICATION forming part of Letters Patent No. 732,709, dated July 7, 1903.

Application filed October 22, 1902. Serial No. 128,256. (No model.)

*To all whom it may concern:*

Be it known that I, HENRY R. CASSEL, a citizen of the United States, residing at New York city, (Manhattan,) county and State of New York, have invented a new and Improved Apparatus for Extracting Gold from Ore, of which the following is a specification.

This invention relates to an improved apparatus for extracting gold from ores in an economical and effective manner.

The accompanying drawing represents a side elevation, partly in section, of my improved apparatus.

The letter $a$ represents a vat or vessel for containing ore and having a manhole provided with a cover $a'$, that renders the vat vapor-tight. Into vat $a$ pass metal pipes $a^2$ and $a^3$, leading, respectively, by flexible hose connections $a^4$ $a^5$ to an alkaline-bromin-solution tank $b$ and an acid-tank $c$. The pipes $a^2$ $a^3$ are controlled by cocks $b'$ $c'$ and terminate above an overflow or distributing pan or mixer $a^7$, arranged in the neck $a^6$ of vat $a$, the pan being suspended from cover $a'$ by fastenings $a^8$. The pan $a^7$ is arranged within the upper part of vat $a$ above the ore-level, so that the mixed solutions are gradually distributed over the ore by descending upon the same from the pan. The vat $a$ is furthermore provided with a vent $a^9$ and a filter $a^{10}$. This filter is by pipe $d'$, having cock $d^2$, connected to a closed gold-solution tank $d$. The tank $d$ is further connected by pipe $e'$, having cock $e^2$, to a bromate and acid tank $e$, and by pipe $f'$, having cock $f^2$, to the top of a closed vaporizing or scrubbing tower $f$. The tower $f$ is filled with pebbles $f^3$, adapted to subdivide the charge, while an air-blast may be introduced into the bottom of the tower through blast-pipe $f^4$, connected to an air-blower $f^6$. From the bottom of tower $f$ a bent pipe $l'$ leads to the gold-precipitating tank $l$, while from the top of tower $f$ a pipe $f^5$ leads to the bottom of a bromin-recovery tower $g$. The tower $g$ is filled with pebbles $g'$ similar to tower $f$; but its top is open and provided with a perforated pan or spiral $g^2$. Into this pan a solution of sodium hydroxid is led from tank $h$ by pipe $h'$, having cock $h^2$. At the bottom the tower $g$ is connected by bent pipe $i$ to a recovered-bromin-solution tank $k$. From this tank a pipe $m$, coupled to a pump or lifter $m'$, leads to tank $b$ to form a cycle. The pipe $m$ has a faucet $m^2$ emptying into tank $h$ and a cock $m^3$ above said faucet.

For extracting gold from ore by means of the above apparatus I proceed as follows: The vat $a$ being charged with ore and tightly closed, I form in tank $b$ a leaching solution by mixing bromin with sodium hydroxid.

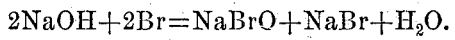
$$2NaOH+2Br=NaBrO+NaBr+H_2O.$$

This solution is run into pan $a^7$ simultaneously with a charge of sulfuric acid from tank $c$, by means of which the bromin is set free within the pan.

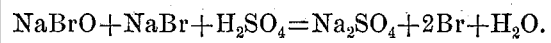
$$NaBrO+NaBr+H_2SO_4=Na_2SO_4+2Br+H_2O.$$

The free acid bromin solution runs over pan $a^7$, gradually leaches through the ore, and passes through the filter $a^{10}$ into the closed tank $d$. The bromin during its passage through the ore dissolves the gold and combines also with the bases generally present—such as lime, magnesia, alumina, &c.—forming bromids. The solution in tank $d$ will thus contain dissolved gold, free bromin, bromids, and any excess of acid.

To recover all the bromin, it is necessary to decompose the bromids, and this is effected by a mixture of a bromate of sodium or other suitable bromate with sulfuric acid prepared in tank $e$. The bromate of sodium and the sulfuric acid alone do not react upon each other in dilute solutions within tank $e$; but in the presence of bromids all the bromin of the bromids, as well as that contained in the bromate, is set free. Thus by running the mixture from tank $e$ into vat $d$ the bromate solution immediately begins to react and all the bromin is liberated with the exception of that combined with the gold.

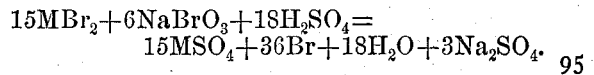
$$15MBr_2+6NaBrO_3+18H_2SO_4=$$
$$15MSO_4+36Br+18H_2O+3Na_2SO_4.$$

When all the bromin has been set free in the manner described, the solution from tank $d$ is allowed to run through pipe $f'$ into the tower $f$, within which it is subdivided by means of the pebbles. A jet of air introduced at the bottom of tower $f$ through pipe $f^4$ will now vaporize the bromin in the descending subdivided solution, the bromin vapors being driven by the air-blast through the pipe $f^5$ into the bottom of the recovery-tower $g$. A solution of an alkaline hydroxid, such as sodium hydroxid, is led from tank $h$ through pipe $h'$ into the pan $g^2$ to combine with the ascending bromin vapors and form an alkaline bromin solution, which I term the "recovered-bromin" solution. This solution is run into tank $k$ and is thence pumped through pipe $m$ into tank $b$ for treating a new batch of ore after being mixed with acid from tank $c$. If desired, the solution from tower $g$ may be run once more through tank $h$ by closing cock $m^3$ and opening faucet $m^2$. The gold solution from the vaporizing-tower $f$ deprived of its free bromin runs into tank $l$, where the gold is precipitated by hydrogen sulfid or in other manner.

The bromate and acid solution may be introduced into vat or vessel $a$ instead of vat $d$; but in that case the solution from vat $d$ is pumped into tank $a$ to secure a thorough mixture and perfect decomposition of the bromids.

If the vessel $a$ is made in the form of a rotating barrel, I first introduce the mixture of bromate and sufficient acid to decompose the bromates and bromids. The ore is then charged, and finally the alkaline bromin solution is added.

What I claim is—

1. In an apparatus for extracting gold from ore, the combination of an ore vessel with an inclosed solution-distributer arranged within the upper part of the vat above the ore-level, a pair of tanks, and pipes that lead from said tanks to said distributer, substantially as specified.

2. In an apparatus for extracting gold from ore, the combination of an ore vessel with an inclosed solution-distributer arranged within the upper part of the vat above the ore-level, a pair of tanks, pipes leading from said tanks to said distributer, a solution-vat connected to the ore vessel, and a tank connected to the solution-vat, substantially as specified.

3. In an apparatus for extracting gold from ore, the combination of a solution-vat with a communicating closed vaporizing-tower, a pipe entering the bottom of said tower, an air-blower connected with said pipe, an open recovery-tower, a pipe leading from the upper part of the vaporizing-tower into the lower part of the recovery-tower, a precipitating-tank connected with the vaporizing-tower, and a recovery-tank connected with the recovery-tower, substantially as specified.

4. An apparatus for extracting gold from ore, composed of an ore vessel, an alkaline-bromin-solution tank, and an acid-tank communicating therewith, a solution-vat, a communicating tank, a vaporizing-tower, an air-blast pipe, a gold-precipitating tank and a bromin-recovery tower communicating with the vaporizing-tower, a pan in the recovery-tower, a tank communicating therewith, a recovered-bromin-solution tank communicating with the recovery-tower, and means for connecting said tank with the alkaline-bromin-solution tank, substantially as specified.

Signed by me at New York city, (Manhattan,) New York, this 21st day of October, 1902.

HENRY R. CASSEL.

Witnesses:
WILLIAM SCHULZ,
F. V. BRIESEN.